(12) United States Patent
Lee et al.

(10) Patent No.: US 7,533,872 B2
(45) Date of Patent: May 19, 2009

(54) OXYGEN GENERATOR

(75) Inventors: Tae Soo Lee, Gyeonggi-do (KR); Yoon Sun Choi, Seoul (KR); Young Duck Kim, Gyeonggi-do (KR)

(73) Assignee: Oxus Co., Ltd. (KR)

( * ) Notice: Subject to any disclaimer, the term of this patent is extended or adjusted under 35 U.S.C. 154(b) by 63 days.

(21) Appl. No.: 11/851,610

(22) Filed: Sep. 7, 2007

(65) Prior Publication Data

US 2008/0315441 A1 Dec. 25, 2008

(30) Foreign Application Priority Data

Jun. 19, 2007 (KR) .................... 10-2007-0060030

(51) Int. Cl.
*B01F 3/04* (2006.01)
(52) U.S. Cl. .................. 261/24; 96/110; 96/151; 96/152; 96/381; 261/26; 261/65; 261/119.1; 261/DIG. 65; 422/124
(58) Field of Classification Search .......... 261/24, 261/26, 64.1, 65, 72.1, 119.1, DIG. 65; 96/110, 96/115, 151, 152, 381, 384, 385; 422/123, 422/124
See application file for complete search history.

(56) References Cited

U.S. PATENT DOCUMENTS

| | | | | | |
|---|---|---|---|---|---|
| 2,002,553 | A | * | 5/1935 | Somers | 96/232 |
| 2,874,797 | A | * | 2/1959 | Flury | 96/239 |
| 3,806,102 | A | * | 4/1974 | Valenta et al. | 261/142 |
| 4,067,935 | A | * | 1/1978 | Jones et al. | 128/203.14 |
| 4,172,865 | A | * | 10/1979 | Steier | 261/62 |
| 4,192,836 | A | * | 3/1980 | Bartscher et al. | 261/142 |
| 4,644,790 | A | * | 2/1987 | Mizoguchi | 73/293 |
| 4,693,734 | A | * | 9/1987 | Erickson, Jr. | 96/333 |
| 4,789,388 | A | * | 12/1988 | Nishibata et al. | 96/7 |
| 5,247,604 | A | * | 9/1993 | Chiu | 392/406 |
| 5,339,383 | A | * | 8/1994 | Marino | 392/406 |
| 6,869,065 | B1 | * | 3/2005 | Lin | 261/3 |
| 2003/0011086 | A1 | * | 1/2003 | Wu | 261/119.1 |
| 2004/0099967 | A1 | * | 5/2004 | Chen | 261/66 |
| 2005/0087071 | A1 | * | 4/2005 | Petz et al. | 96/52 |
| 2007/0176306 | A1 | * | 8/2007 | Huang | 261/72.1 |

FOREIGN PATENT DOCUMENTS

EP 0469797 A1 * 2/1992 .......... 261/DIG. 65

* cited by examiner

*Primary Examiner*—Richard L Chiesa
(74) *Attorney, Agent, or Firm*—Park & Associates IP Law LLC

(57) ABSTRACT

An oxygen generator including: a humidifier tank moves up and down according to a horizontal movement of an adjustment knob so that the humidifier tank can be readily detachable, and thus a user can securely and conveniently use the oxygen generator without any water leakage from the humidifier tank during an operation of the oxygen generator. Also, it is possible to reduce noise due to driving of a compressor, noise due to the nitrogen exhaustion, and noise due to driving of a fan portion when the oxygen generator operates, to display purity information about the discharged oxygen, sensed by an oxygen sensor, as a digitalized numerical value on a display portion so that a user may readily recognize a current oxygen purity, and to drive the compressor at a low power consumption based on a discharge flow rate of oxygen and thereby reduce the power consumption.

13 Claims, 6 Drawing Sheets

OXYGEN GENERATOR

REFERENCE TO RELATED APPLICATIONS

This application claims the benefit of Korean Application No. 2007-0060030, filed Jun. 19, 2007 in the Korean Intellectual Property Office, the entire disclosure of which is incorporated herein by reference.

FIELD OF THE INVENTION

Aspects of the present invention relates to an oxygen generator wherein an absorption tower can be smoothly detachable, noise due to an operation of the oxygen generator and also noise due to an operation of a compressor and nitrogen discharge from the absorption tower can be reduced, and a humidifier tank can be readily installed and separated.

BACKGROUND OF THE INVENTION

In general, an oxygen generator is used for various purposes. For example, the oxygen generator supplies oxygen in a space as an office or home and thereby helps people to recover from daily fatigues and also helps activation of cells. Also, in a space such as a fitness center where many people do exercises, the oxygen generator supplies sufficient amount of oxygen and thereby improves the efficiency of exercise and health.

The oxygen generator may continuously supply oxygen to a patient with chronic obstructive pulmonary disease, and thereby may help the treatment. The oxygen generator adsorbs nitrogen to zeolite by using the characteristic of an adsorbent called zeolite, adsorbing gas molecules and thereby generates oxygen. In this instance, the nitrogen occupies about 80% in the air.

Such an oxygen generator caused noise due to its operation and thus raised complaints from a user that desired a quiet environment. Also, a humidifier tank of humidifying oxygen generated from the oxygen generator is coupled with the oxygen generator by a screw coupling method. Accordingly, women, children, old people, and the like may not readily use the oxygen generator. Also, while coupling the humidifier tank with or dissembling the same from the oxygen generator, water may overflow or may not be readily coupled. Also, when replacing long-time used zeolite with a new product, the zeolite may not be readily replaced on the spot. Accordingly, there is a need for quick countermeasure.

SUMMARY OF THE INVENTION

Aspects of the present invention are directed to solve the above-described drawbacks. Aspects of the present invention provide an oxygen generator, in which can reduce noise, which may occur when the external air flows in or is discharged via the oxygen generator, and also can be smoothly detachable from an absorption tower and a humidifier tank.

An oxygen generator, according to aspects of the invention, includes: a body portion comprising a fan portion which is installed in an upper portion of a separator to absorb the external air wherein the separator separates an inner area of the oxygen generator in a widthwise direction, a compressor which is installed in a lower portion of the separator to generate the high pressure of the compressed air, a valve manifold assembly which is switched on/off according to an oxygen discharge flow rate adjusted by a user to control the supply of the compressed air provided from the compressor, and an absorption tower comprising an adapter which is supplied with the compressed air passing through the valve manifold assembly to generate the high purity of concentrated oxygen and includes a plurality of ports formed on a top portion and a bottom portion outside of a bed housing; a cover portion comprising a front cover and a rear cover which are disposed on a front and a rear of the body portion respectively, and side covers which are detachably disposed on both a left side and a right side, and on a top of the body portion; a humidifier tank being installed in a mounting portion put in the front cover to humidify the dry concentrated oxygen, generated from the absorption tower, and then supply the humidified concentrated oxygen, and comprising a cam adjuster wherein the cam adjuster is coupled with an adjustment knob moving in the widthwise direction so that the humidifier tank is fixed on a top of the mounting portion when the humidifier tank moves up, and moves from the top to a lower portion of the mounting portion and thereby is readily withdrawn; a display portion being installed in a front top portion of the body portion to display a purity state of oxygen that the user is currently inhaling, a discharge flow rate thereof, and a malfunction for the user's recognition; a switch portion comprising a first switch which is installed adjacent to the display portion to switch on/off the oxygen generator, and a second switch which selectively adjusts an oxygen discharge flow rate; and a control portion receiving a signal according to a manipulation of the switch portion to control an amount of air supplied from the compressor to the absorption tower and a number of revolutions of the compressor, and control unstable oxygen when the unstable oxygen is generated from the oxygen generator.

In this instance, the separator of the body portion may include: a first separator of which one end is spaced apart from a front of the body portion and extended towards a lower portion of the body portion, and of which another end is vertically curved and extended to a rear of the body portion, and including a first passing hole formed on a front end so that the absorbed air via the fan portion is moved to a location of the compressor; a second separator being spaced apart from a lower portion of the first separator to be parallel therewith, and including a second passing hole formed on a rear end; and a partition wall dividing the inner area by a similar area ratio along a lengthwise direction of the inner area in an exhaustion chamber to discharge the air to an exhaustion grill wherein the exhaustion chamber is formed between a lower portion of the second separator and a bottom board, and the exhaustion grill is formed on the bottom of the body portion.

A noise blocking panel or sound-absorbing materials may be provided on a top and a bottom of each of the first and the second separators to block and absorb noise occurring from within the oxygen generator.

Also, the partition wall of the body portion may include: a first partition wall of which one end is extended from a center of the widthwise direction of the exhaustion chamber along the lengthwise direction thereof and is externally curved; and a second partition wall being installed in a path where the external air flown via the second passing hole is discharged to the exhaustion grill via the first partition wall, and of which one is fixed in the lengthwise direction of the exhaustion chamber to be horizontally extended and of which another end is spaced apart from the first partition wall.

Also, the compressor of the body portion may include: a damping portion comprising: a damping rubber being installed to be spaced apart from another damping rubber on the second separator and absorb various vibrations and shocks wherein the various vibrations and shocks are transmitted to the compressor via the bottom of the oxygen generator; and a spring of which one end is fixed to the bottom of the compressor and of which another end is connected to the top of the damping rubber.

Also, the front cover of the cover portion may include: a guide facing another guide in an inner top portion of the mounting portion to stably receive the humidifier tank when the humidifier tank is mounted to the mounting portion.

Also, the humidifier tank may include: a cover being formed with a guide piece on a top of a humidifier cup, which is protruded from each of both left and right sides of a cover body to guide an oxygen discharge outlet, formed in the front of the cover body, to face the front of the oxygen generator wherein the water fills the inside of a humidifier cup and the cover body is coupled with a humidifier cup using screws, and a combining bracket being fixed to the upper portion of the mounting portion of the front cover and being connected to a tube line into which the concentrated oxygen generated from the absorption tower is input, the cam adjuster disposed in the lower portion of the humidifier tank comprises: a receiving portion being inserted from the rear of the mounting portion and including a protrusion upwardly protruded on the center of a receiving groove, and an adjustment cam including an insertion groove which is formed on the bottom of a cam body to receive the protrusion of the receiving portion, and a spiral combining groove which is formed along the upper portion of an outer circumferential surface of the cam body from a lower portion thereof, and an adjustment knob comprises: an insertion piece being protruded from an inner circumferential surface of an adjustment ring so that the adjustment cam is inserted into the insertion piece wherein the adjustment ring is extended from a handle of the adjustment knob, and a fixing portion being coupled with the adjustment cam, coupled with the adjustment cam, on the adjustment knob, and thereby being fixed on the receiving portion, and including a guide groove to receive a lower end of the humidifier cup.

Also, a plurality of ribs may be formed on the outer circumferential surface of the protrusion of the receiving portion.

Also, an auxiliary groove may be formed in the insertion groove of the adjustment cam to be coupled with the plurality of ribs formed on the protrusion.

Also, the adjustment knob may relatively move with respect to the fixed adjustment cam and thereby move up and down the adjustment cam in a state where the adjustment cam is fixed to the protrusion.

Also, the switch portion may include a purity detection switch to momentarily detect the purity of oxygen that the user is currently inhaling and thus a current purity is displayed on the display portion according to an operation of the purity detection switch.

Also, a wheel may be installed in each of corners of the body portion on the bottom thereof to smoothly move the oxygen generator, and the wheel includes a lock to stop the movement when the oxygen generator is completely moved and to fix or release the wheel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which.

DETAILED DESCRIPTION OF THE INVENTION

Figure 1:
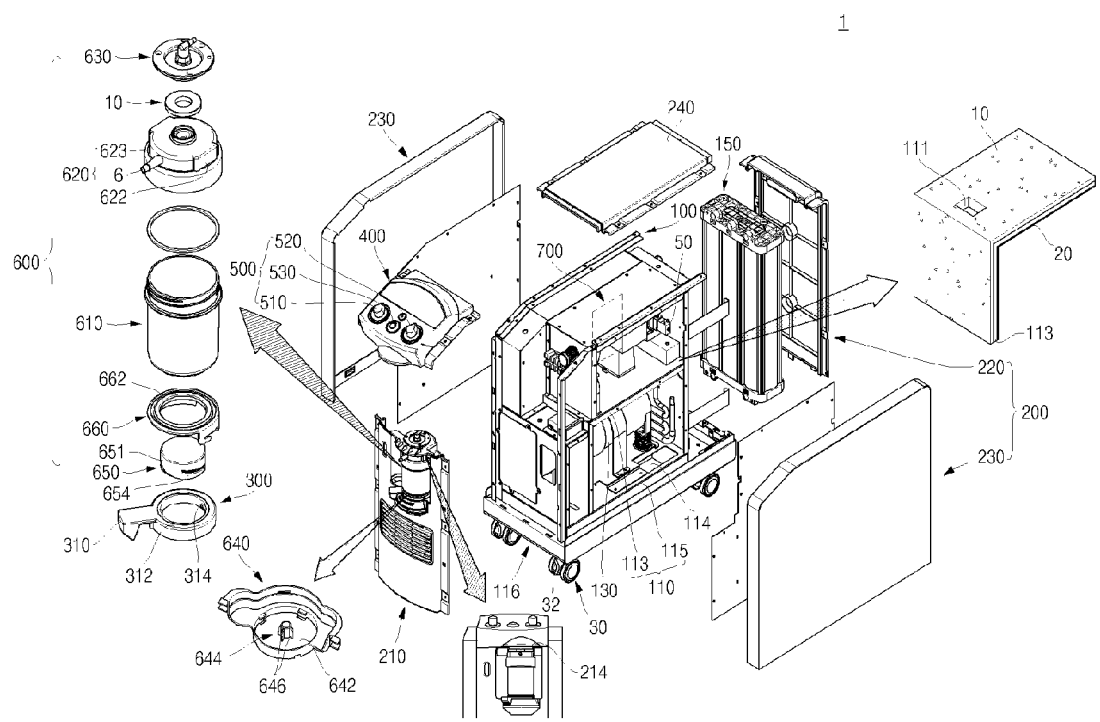
FIG. 1 is an exploded perspective view of an oxygen generator according to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
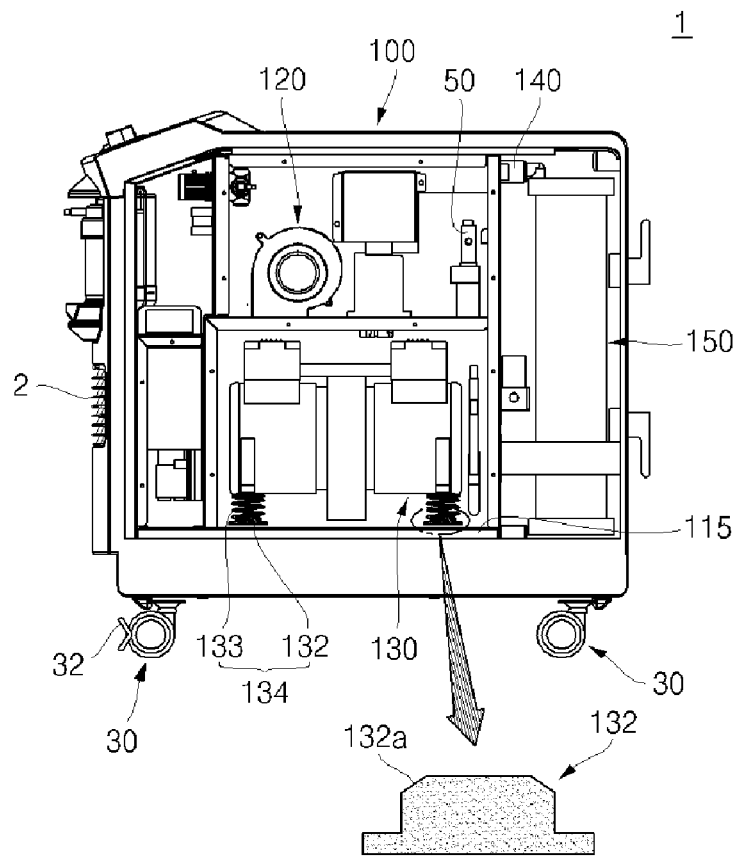
FIG. 2 is a side view of an oxygen generator according to a present invention.
Figure 3:
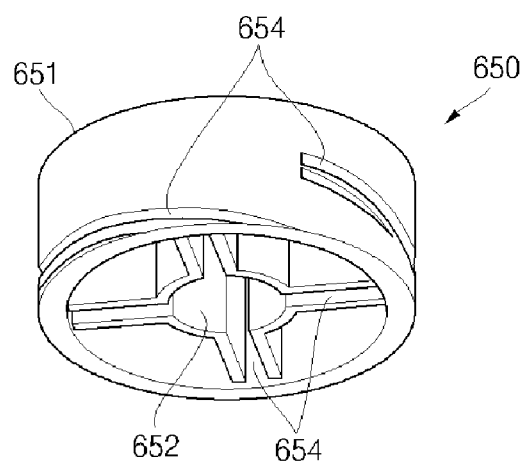
FIG. 3 is a perspective view illustrating an adjustment cam of an oxygen generator according to a present invention.
Figure 4:
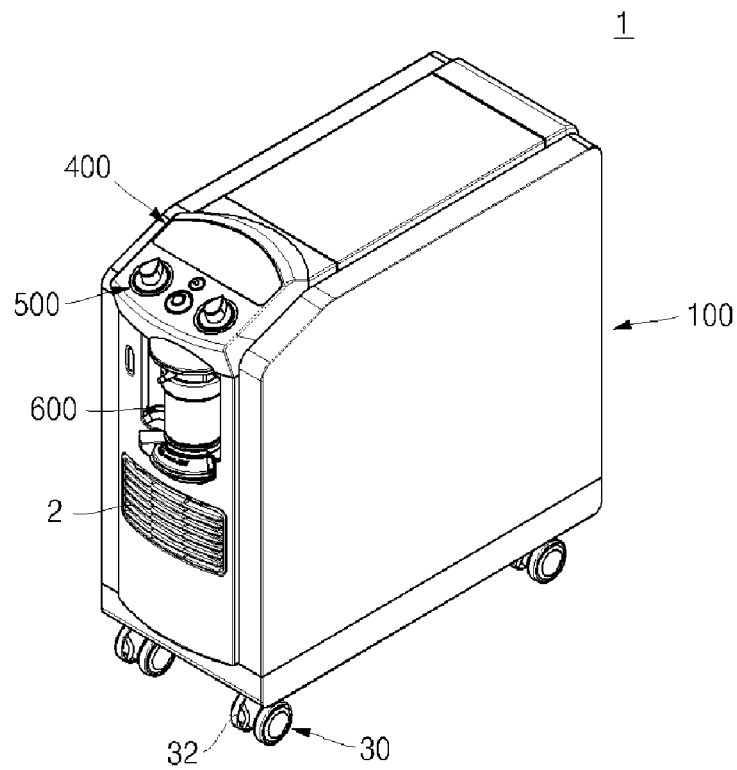
FIG. 4 is a perspective view illustrating an assembled oxygen generator according to a present invention.
Figure 5:
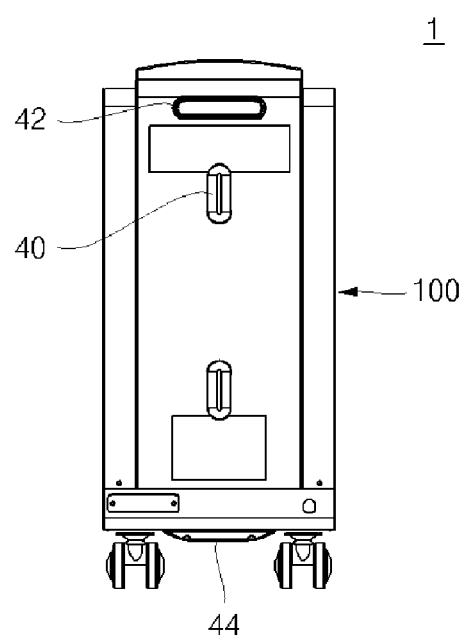
FIG. 5 is a rear view of an oxygen generator according to a present invention.
Figure 6:
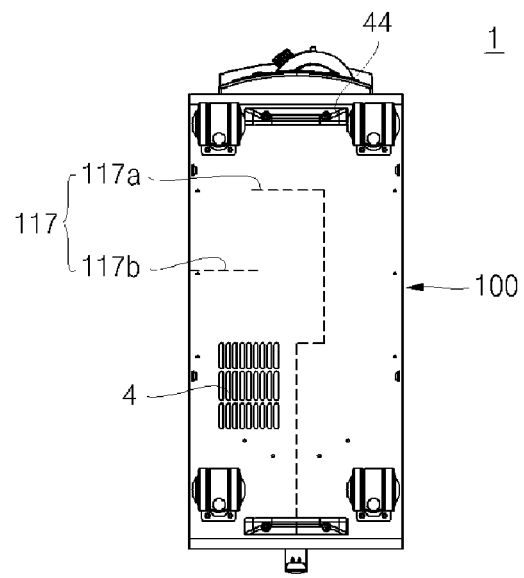
FIG. 6 is a bottom view of an oxygen generator according to a present invention.
Figure 7A:
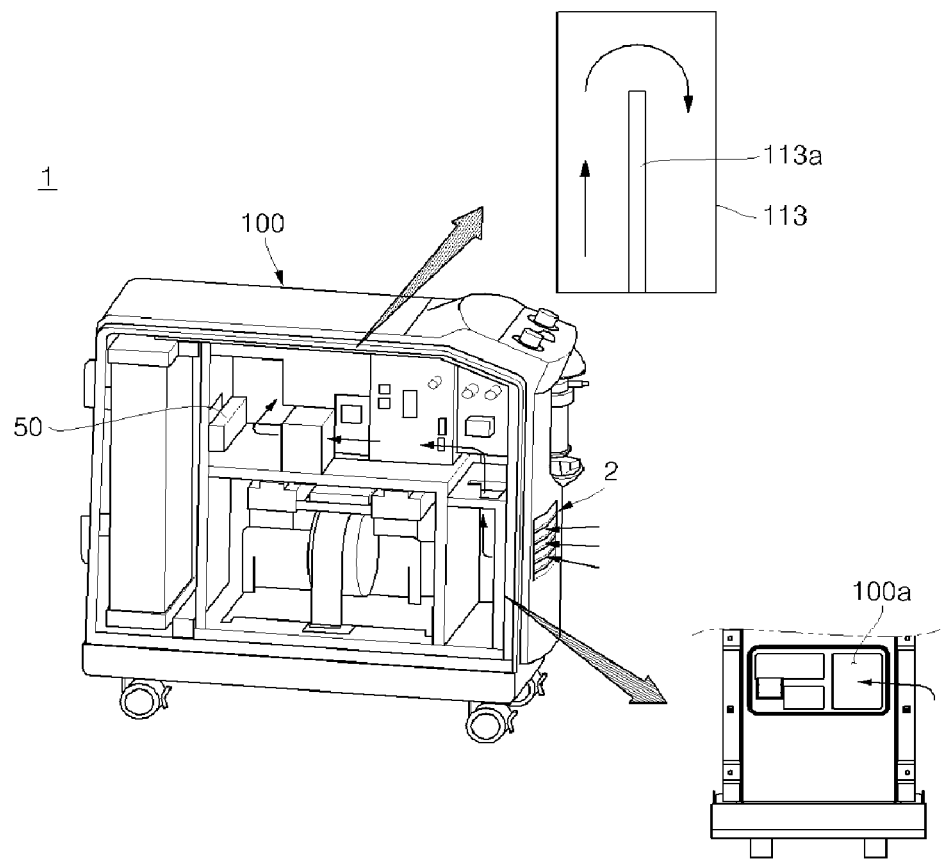
FIGS. 7a through 7c are operational state views of an oxygen generator according to a present invention.
Figure 7B:
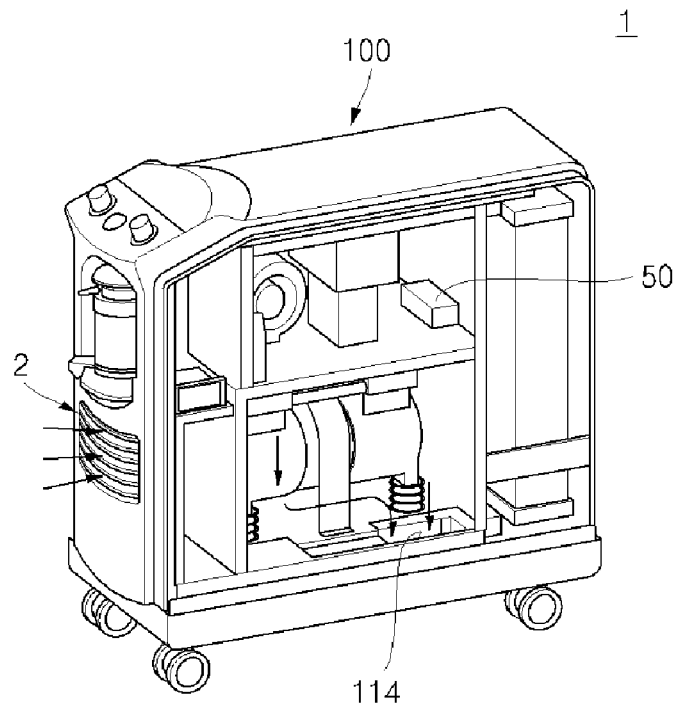
Figure 7C:
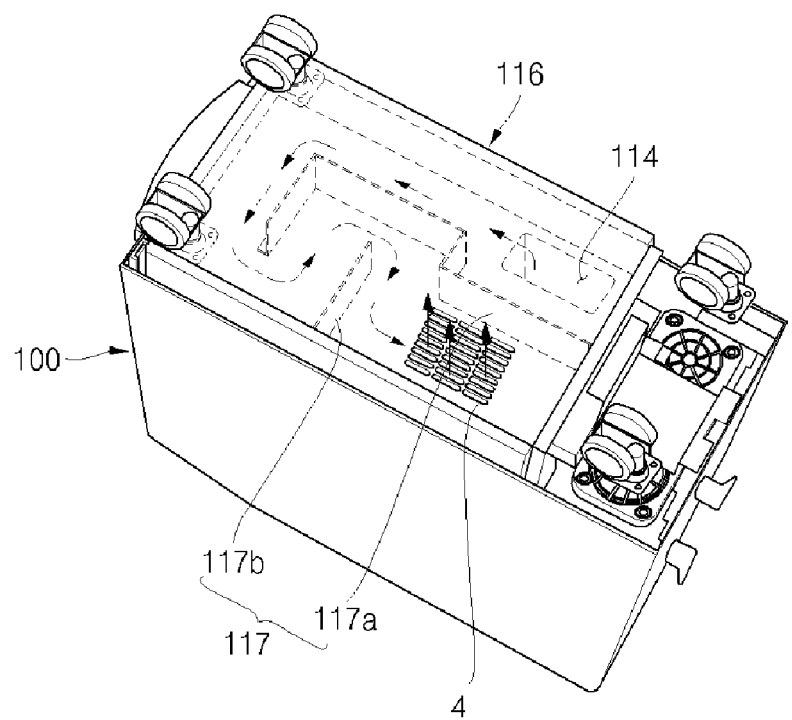
Figure 8A:
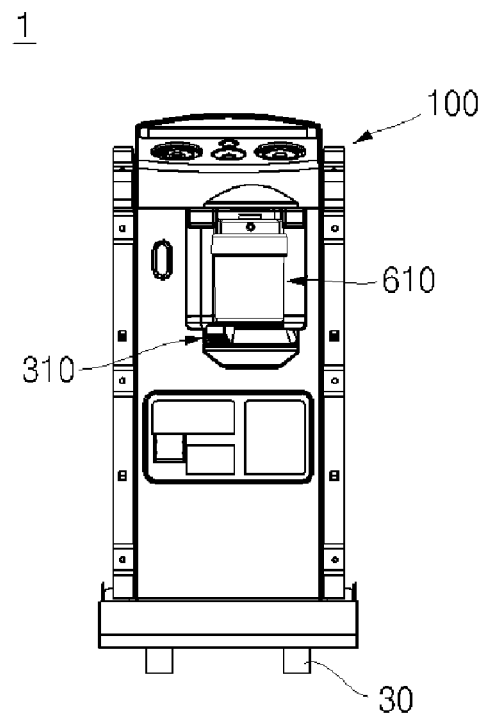
FIGS. 8a and 8b are operational state views of a humidifier tank installed in an oxygen generator according to a present invention.
Figure 8B:
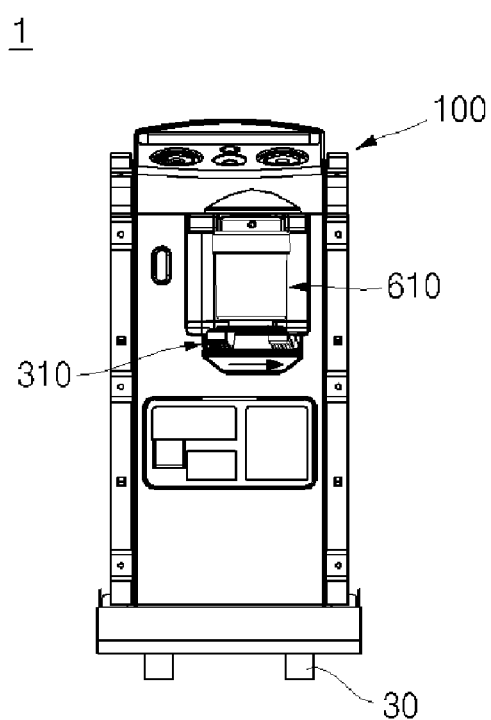

FIG. 1 is an exploded perspective view of an oxygen generator according to the present invention, FIG. 2 is a side view of an oxygen generator according to the present invention, FIG. 3 is a perspective view illustrating an adjustment cam of an oxygen generator according to the present invention, FIG. 4 is a perspective view illustrating an assembled oxygen generator according to the present invention, FIG. 5 is a rear view of an oxygen generator according to the present invention, FIG. 6 is a bottom view of an oxygen generator according to the present invention, FIGS. 7a through 7c are operational state views of an oxygen generator according to the present invention, and FIGS. 8a and 8b are operational state views of a humidifier tank installed in an oxygen generator according to the present invention.

Referring to FIGS. 1 through 8b, an oxygen generator 1 includes a body portion 100. The body portion 100 includes a fan portion 120 which is installed in an upper portion of a separator 110 to absorb the external air wherein the separator 110 separates an inner area of the oxygen generator 1 in a widthwise direction, a compressor 130 which is installed in a lower portion of the separator 110 to generate the high pressure of the compressed air, a valve manifold assembly 50 which is switched on/off according to an oxygen discharge flow rate adjusted by a user to control the supply of the compressed air provided from the compressor 130, and an absorption tower 150 including an adapter 140 which is supplied with the compressed air passing through the valve manifold assembly 50 to thereby generate the high purity of concentrated oxygen and includes a plurality of ports (not shown) on a top portion and a bottom portion outside of a bed housing (not shown).

The separator 110 of the body portion 100 includes a first separator 113 of which one end is spaced apart from a front of the body portion 100 and extended towards a lower portion of the body portion 100, and of which another end is vertically curved and extended to a rear of the body portion 100, and which includes a first passing hole 111 formed on a front end so that the absorbed air via the fan portion 120 is moved to a location of the compressor 113, a second separator 115 which is spaced apart from a lower portion of the first separator 113 to be parallel therewith, and includes a second passing hole 114 formed on a rear end, and a partition wall 117 which divides the inner area by a similar area ratio along a lengthwise direction of the inner area in an exhaustion chamber 116 to discharge the air to an exhaustion grill 4 wherein the exhaustion chamber 116 is formed between a lower portion of the second separator 115 and a bottom board, and the exhaustion grill 4 is formed on the bottom of the body portion 100.

A noise blocking panel 10 or sound-absorbing materials 20 are provided on a top and a bottom of each of the first and the second separators 113 and 115 to block and absorb noise occurring from within the oxygen generator 1.

In this instance, the noise blocking panel 10 may be installed alone in each of the first and the second separators 113 and 115. Also, both the noise blocking panel 10 and the sound-absorbing materials 20 may be used at the same time.

Preferably, the sound-absorbing materials 20 may include sponge including porous porm, however, the present invention is not particularly limited thereto.

The high pressure of compressed air, which is compressed with the pressure greater than or equal to the atmospheric pressure, is supplied to the valve manifold assembly 50 and then to the absorption tower 150, to enable the supply and discharge of the compressed air to be carried out. In this instance, the valve manifold assembly 50 is placed in a rear end of the first separator 113. Also, the valve manifold assembly 50 may use, preferably, either a 5-port 3-way solenoid valve or a plurality of 3-port 2-way solenoid valves, but the present invention is not particularly limited thereto.

Also, the body portion 100 includes a cover portion 200 including a front cover 210 and a rear cover 220 which are disposed on a front and a rear of the body portion 100 respectively, and side covers 230 which are detachably disposed on both a left side and a right side, and on a top of the body portion 100, and a humidifier tank 600 being installed in a mounting portion 212 put in the front cover 210 to humidify the dry concentrated oxygen, generated from the absorption tower 150, and then supply the humidified concentrated oxygen, and includes a cam adjuster 300 wherein the cam adjuster 300 is coupled with an adjustment knob 310 moving in the widthwise direction so that the humidifier tank 600 is fixed on a top of the mounting portion 212 when the humidifier tank 600 moves up, and moves from the top to a lower portion of the mounting portion 212 and thereby is readily withdrawn.

In this instance, the body portion 100 is formed in a rectangular shape. Also, the side cover 230 is disposed on the top of the body portion 100 to be slid towards one side direction and coupled therewith. In addition to the front cover 210, the rear cover 220, and the side covers 230, a top cover 240 is separately provided.

Also, the body portion 100 includes a display portion 400 which is installed in a front top portion of the body portion 100 to display a purity state of oxygen that the user is currently inhaling, a discharge flow rate thereof, and a malfunction for the user's recognition, and a switch portion 500 including a first switch 510 which is installed adjacent to the display portion 400 to switch on/off the oxygen generator 1, and a second switch 520 which selectively adjusts an oxygen discharge flow rate.

Also, the body portion 100 includes a control portion 700 which receives a signal according to a manipulation of the switch portion 500 to control an amount of air supplied from the compressor 130 to the absorption tower 150 and a number of revolutions of the compressor 130, and control unstable oxygen when the unstable oxygen is generated from the oxygen generator 1.

In this instance, the fan portion 120 functions to cool the heat that is generated when the compressor 130 disposed on the second separator 115 operates, or to cool an area where the compressor 130 is installed.

Also, the partition wall 117 of the body portion 100 includes a first partition wall 117a of which one end is extended from a center of the widthwise direction of the exhaustion chamber 116 along the lengthwise direction thereof and is externally curved, and a second partition wall 117b being installed in a path where the external air flown via the second passing hole 114 is discharged to the exhaustion grill 4 via the first partition wall 117a, and of which one is fixed in the lengthwise direction of the exhaustion chamber 116 to be horizontally extended and of which another end is spaced apart from the first partition wall 117a.

Also, the compressor 130 of the body portion 100 includes a damping portion 134. The damping portion 134 includes a damping rubber 132 being installed to be spaced apart from another damping rubber on the second separator 115 and absorb various vibrations and shocks wherein the various vibrations and shocks are transmitted to the compressor 130 via the bottom of the oxygen generator 1.

Also, the damping portion 134 includes a spring 133 of which one end is fixed to the bottom of the compressor 130 and of which another end is connected to the top of the damping rubber 134.

In this instance, the damping rubber 133 includes an inclined portion 132a which is upwardly protruded and externally included along an outer circumferential surface of the damping rubber 132 so that the bottom of the spring 133 may be stably installed on the damping rubber 132.

Also, the front cover 210 of the cover portion 200 includes a guide 214 facing another guide in an inner top portion of the mounting portion 212 to stably receive the humidifier tank 600 when the humidifier tank 600 is mounted to the mounting portion 212.

Also, the humidifier tank 600 includes a cover 620 which is formed with a guide piece 622 on a top of a humidifier cup 610, which is protruded from each of both left and right sides of a cover body to guide an oxygen discharge outlet 6, formed in the front of the cover body, to face the front of the oxygen generator 1 wherein the water fills the inside of a humidifier cup 610 and the cover body is coupled with a humidifier cup 610 using screws, and a combining bracket 630 which is fixed to the upper portion of the mounting portion 212 of the front cover 210 and is connected to a tube line (not shown) into which the concentrated oxygen generated from the absorption tower 150 is input. The cam adjuster 300 disposed in the lower portion of the humidifier tank 600 includes a receiving portion 640 which is inserted from the rear of the mounting portion 212 and includes a protrusion 644 upwardly protruded on the center of a receiving groove 642, and an adjustment cam 650 which includes an insertion groove 652 which is formed on the bottom of a cam body 651 to receive the protrusion 644 of the receiving portion 640, and a spiral combining groove 654 which is formed along the upper portion of an outer circumferential surface of the cam body 651 from a lower portion thereof.

The adjustment knob 310 includes an insertion piece 314 which is protruded from an inner circumferential surface of an adjustment ring 312 so that the adjustment cam 650 is inserted into the insertion piece 310 wherein the adjustment ring 312 is extended from a handle of the adjustment knob 310, and a fixing portion 660 which is coupled with the adjustment knob 310, coupled with the adjustment cam 650, on the adjustment knob 310, and thereby being fixed on the receiving portion 640, and includes a guide groove 662 to receive a lower end of a humidifier cup 610.

A plurality of ribs 646 is formed on the outer circumferential surface of the protrusion 644 of the receiving portion 640.

Also, an auxiliary groove 654 is formed in the insertion groove 652 of the adjustment cam 650 to be coupled with the plurality of ribs 646 formed on the protrusion 644. In this case, the plurality of ribs 646 is installed to be coupled with the auxiliary groove 654.

In a state where the adjustment cam 650 is fixed to the protrusion 644, the adjustment knob 310 relatively moves with respect to the fixed adjustment cam 650 when the adjustment knob operates to left and right sides, so that the adjustment cam 650 may move up and down along the auxiliary groove 654.

The switch portion 500 includes a purity detection switch 530 to momentarily detect the purity of oxygen that the user is currently inhaling and thus a current purity is displayed on the display portion 400 according to an operation of the purity detection switch. In this instance, the purity displayed on the display portion 400 may be constructed to be displayed only when the purity detection switch 530 operates by a pushing operation of the user.

A wheel 30 is installed in each of corners of the body portion 100 on the bottom thereof, to smoothly move the oxygen generator 1, and the wheel 30 includes a lock 32 to stop the movement when the oxygen generator 1 is completely moved and to fix or release the wheel 30.

Hereinafter, an operational state of the oxygen generator 1 constructed as described above will be described with reference to the accompanying drawings.

Referring to FIGS. 1 through 7c, to operate the oxygen generator 1 according to the present invention, when the first switch 510 of the switch portion 500 is switched on and a power is supplied, a desired discharge flow rate of oxygen is selected by operating the second switch 520. In this instance, the discharge flow rate of the oxygen generator 1 increases by 0.5 LPM and thereby oxygen is discharged.

When the power is supplied, a fan (not shown) installed in the fan portion 120 rotates whereby the air is flown from the outside via an intake grill 2. The external air flown via the intake grill passes through an area between the front cover 210 and the body portion 100, and moves towards the lower portion of the first separator 113 via an opening 100a formed on the front of the body portion 100. Next, as indicated by an arrow head, the external air moves towards the upper portion of the first separator 113.

Since a plurality of printed circuit boards (PCBs) including the control portion 700 is installed on the first separator 113, the corresponding area may be maintained at a relatively high temperature state in comparison to other areas among the inner area of the oxygen generator 1. Accordingly, the external air flown via the intake grill 2 is induced to an upper area of the first separator 113 to be cooled.

Also, a portion of the external air induced to the upper area of the first separator 113 is supplied to a lower area of the first separator 113 via the first passing hole 111 through which the air from the fan portion 120 is discharged. The remaining air moves to an opposite side via an end of a separation wall which is vertically installed in the upper portion of the first separator 113. Next, the remaining air is filtered by a filter (not shown) which filters foreign materials included in the external air, and then supplied to the compressor 130. Rotations per minute (rpm) of the compressor 130 is variably adjusted by the control portion 700 according to an operation of the second switch 520.

Since the compressor 130 includes the damping portion 134 which absorbs vibrations and shocks, which may occur when the oxygen generator 1 operates, the damping portion 134 itself may absorb the vibrations and shocks. Also, the damping portion 134 absorbs vibrations, transmitted via the second separator 115, using the damping rubber 132 formed of rubber. In this instance, vibrations and shocks, which are not absorbed by the damping rubber 132, are reduced by the spring 133 and thereby minimum shocks may be transmitted to the compressor 130. Conversely, vibrations and shocks, occurring due to an operation of the compressor 130, are reduced via the spring 133 and the damping rubber 132 and thereby reduces noise occurrence due to the oxygen generator 1.

The compressed air via the compressor 130 is moved to a lower portion of the absorption tower 150 via the valve manifold assembly 50. Next, the compressed air is supplied to zeolite (not shown) inside of the absorption tower 150 via an oil groove (not shown). The oil groove is formed in the adapter 140 installed on the bottom of the bed housing of the absorption tower 150. Also, the adapter 140 is formed with the oil groove connected to a plurality of ports and thus may conveniently supply the compressed air, which is generated from the compressor 130, to the inside of the absorption tower 150 without a separate vale or a fitting line.

In the compressed air, supplied to the absorption tower 150, while nitrogen is adsorbing by the zeolite, the high purity of concentrated air is discharged via the upper portion of the absorption tower 150 and then supplied to a regulator (not shown). In this instance, the regulator operates so that the high purity of oxygen may be supplied at a certain pressure, and the oxygen is supplied to the humidifier tank 600 installed in the front of the body portion 100, via a connection tube.

The oxygen, supplied to the humidifier tank 600, is dry. Accordingly, when the user directly inhales the oxygen, the user may feel uncomfortable. Accordingly, the oxygen is humidified passing through the humidifier tank 600 and then supplied to the user.

The pressurization is performed to a plurality of zeolite, installed in the absorption tower 150 so that the absorption tower 150 may operate at an optimal state. In this instance, the equal pressure is selectively supplied to the upper or lower portion of the plurality of zeolite and thereby the high purity of oxygen may be produced.

Hereinafter, the humidifier tank 600 which is readily detachable by a user and a detachable relation of the humidifier tank 600 according to an operation of the adjustment knob 310 will be described with reference to FIGS. 1 through 8b.

To mount the humidifier tank 600 to the mounting portion 212, in a state where a humidifier cup 610 coupled with the cover 620 is grasped by the hand, and the guide 214 formed in the mounting portion 212 faces the guide piece 622 formed in the cover 620, the humidifier tank 600 is pushed into the inside of the mounting portion 212 and thereby a humidifier cup 610 is received in the guide groove 662 of the fixing portion 660. A humidifier cup 610 includes a protruded structure along a circumferential direction of a humidifier cup 610 in the lower end thereof. Accordingly, it is possible to maintain a state where a portion of a humidifier cup 610 is inserted into the inside of the guide groove 662, and to thereby prevent the separation of a humidifier cup 610.

In this instance, the oxygen discharge outlet 6 is located to face the front of the oxygen generator 1, and the adjustment knob 310 is located in an unlocking state. The present invention is not particularly limited to a location when the adjustment knob 310 is in a locking state or the unlocking state. Generally, among total movement displacements that the adjustment knob 310 moves into the widthwise direction, the left side corresponds to the unlocking location and thus a humidifier cup 610 may be separable. Also, the right side corresponds to the locking location.

To locking-couple the humidifier tank 600 on the mounting portion 212 using the adjustment knob 310 with the movement displacements, the user moves the adjustment knob 310 to the locking location by grasping the adjustment knob 310 by the hand. When the adjustment knob 310 is horizontally moved, the adjustment cam 650 is coupled with the protrusion 644 and thereby the horizontal movement is limited and only upward and downward movements are possible. Specifically, the insertion piece 314 of the adjustment knob 310, coupled with the combining groove 654 of the adjustment cam 650, moves to the lower portion along the combination groove 654 of the adjustment cam 650, according to the horizontal movement of the adjustment knob 310. In this instance, the relative movement between the adjustment knob 310 and the adjustment cam 650 is completed, so the adjustment cap 650 is moved upwards and thereby fixed to a Packing ring 10 that is provided on the bottom of the combination bracket 630. Accordingly, it is possible to prevent concentrated oxygen from externally leaking when the concentrated oxygen moves to the inner area of a humidifier cup 610.

The concentrated oxygen, supplied to the inside of the humidifier tank 600, is humidified to include appropriate moisture by the water filled in a humidifier cup 610, and supplied to the user via a supply tube (not shown). In this instance, the supply tube is connected to the oxygen discharge outlet 6.

Such the high purity of concentrated oxygen, generated from the oxygen generator 1, is supplied to a patient or a user needing the high purity of concentrated oxygen. Hereinafter, the intake/exhaustion of the external air and noise according to an operation of the oxygen generator 1 will be described.

When the oxygen generator 1 operates, the intake is flown into the body portion 100 of the oxygen generator 1 via the intake grill 2. The external air flown in the body portion 100 is supplied to the lower portion of the first separator 113 by the fan portion 120. In this instance, the inner area of the body portion 100, which is provided by the front cover 210, the rear cover 220, and the side covers 230 of the body portion 100, and the first and the second separators 113 and 115, functions as an intake duct.

Specifically, the cover portion 200 is installed in the body portion 100 whereby the inner area of the oxygen generator 1 is sealed, and the external air moves to the upper portion and the lower portion based on the separator 110 which separates the inner area of the body portion 100 in the widthwise direction.

The compressor 130 and the absorption tower 150, installed in the oxygen generator 1, inevitably generate noise during the operation thereof. The noise, occurring during the operation of the oxygen generator 1, includes noise according to driving of the compressor 130, noise according to exhaustion occurring of nitrogen, noise according to driving of the fan portion 120, and the like. In this instance, the noise blocking panel 10 and the sound-absorbing materials 20 are provided in the upper portion and the lower portion of each of the first and the second separators 113 and 115 to minimize the noise occurrence. The installed noise blocking panel 10 and the sound-absorbing materials 20 may prevent noise caused by the operation of the fan portion 120, and the noise occurrence caused by the movement of the external air. Also, noise, which may occur when the absorption tower 150 discharges a nitrogen gas to clean the zeolite of the bed housing, is discharged through the lower portion of the first separator 113 and then, absorbed by the noise blocking panel 10 and the sound-absorbing materials 20.

The external air, absorbed via the fan portion 120, is discharged via the second passing hole 114 formed in the second separator 115. In this instance, the air moved via the second passing hole 114 is discharged to the exhaustion grill 4 via the exhaustion chamber 116. In this instance, the external air passing through the exhaustion chamber 116 moves along the partition wall 117 while the noise occurrence is reduced by the partition wall 117. In this instance, the partition wall 117 divides the inner area of the exhaustion chamber 116 based on the same area ratio. Accordingly, noise, which may occur when the external air is discharged to the exhaustion grill 4, may be minimized and thereby the exhaustion is performed.

When the user desires to know the accurate purity of oxygen that the user is currently inhaling, the user operates the purity detection switch 530 of the switch portion 500.

In this case, the control portion 700 receives the operation of the purity detection switch 530, and controls the display portion 400 to display the concentration of oxygen, currently discharged via the oxygen generator 1, and also to display the current discharge flow rate of oxygen after a predetermined period of time elapses.

The zeolite installed in the absorption tower 150 of the oxygen generator 1 needs to be replaced with new one at an appropriated point in time over time, to continuously generate oxygen. To replace the zeolite, operations may be performed as follows.

Referring to FIG. 1, the rear cover 220, disposed in the rear of the body portion 100, is initially separated from the body portion 100 to separate the absorption tower 150 installed in the oxygen generator 1. When the rear cover 220 is separated, the absorption tower 150, installed in the rear of the oxygen generator 1, becomes an externally separable state.

Next, an operator dissembles the coupled state between the adaptor 140 coupled with the absorption tower 150 and various types of tubes and the valve manifold assembly 50, externally separates only the absorption tower 150, and then replaces the zeolite with the new one and locates the absorption tower 150 in an original location. Through the above process, the replacing operation is simply completed.

Also, when a user moves the oxygen generator 1, the user pulls out a power plug, provided in the rear of the body portion 100, winds the plug on a wire winding hole 40 by a plurality of times, pushes the oxygen generator 1 to a desired location with holding a fixed rear handle 42, and thereby moves the oxygen generator 1 to the desired location. In this instance, since the wheels 30 are installed on the bottom of the body portion 100 of the oxygen generator 1, it is possible to readily move the oxygen generator 1 to the desired location. When the user moves the oxygen generator 1 to the desired location, the user operates the lock 32, installed in the wheel 30, into one direction and thereby prevents the movement of the wheel 30.

Also, a user may move the oxygen generator 1 with holding a grip 44 by the hand. In this instance, the grip 44 is installed in each of a front bottom end and a rear bottom end of the oxygen generator 1.

As described above, according to the present invention, there is provided an oxygen generator in which only an absorption tower can be readily detachable in a state where only a rear cover is separated, and a humidifier tank can be simply installed and separated. Accordingly, even when a user is a woman, an old person, or a feeble person, the user can readily use the oxygen generator and also can visually recognize the purity of oxygen. Accordingly, it is possible to improve the reliability about a product.

Further, according to the above-described embodiment of the invention, it is possible to reduce the noise occurrence caused by absorption of the external air and thereby to reduce noise according to an operation of a compressor, noise according to the nitrogen exhaustion of an absorption tower, and noise according to an operation of a fan portion. Also, since a side panel is installed to help replacing of internal portions, the replacement can be quickly performed in an after service (AS), or in a repair. Accordingly, the customer satisfaction can be improved and a cost burden of a customer side can be reduced according to low power consumption. Also, since a power changes based on a necessary oxygen flow rate of a patient, it is possible to improve the customer convenience and reduce the cost burden of the customer side.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An oxygen generator comprising:
   a body portion comprising:
   a fan portion which is installed in an upper portion of a separator to absorb the external air wherein the separator separates an inner area of the oxygen generator in a widthwise direction, a compressor which is installed in a lower portion of the separator to generate the high pressure of the compressed air, a valve manifold assembly which is switched on/off according to an oxygen discharge flow rate adjusted by a user to control the supply of the compressed air provided from the compressor, and an absorption tower comprising an adapter which is supplied with the compressed air passing through the valve manifold assembly to generate the high purity of concentrated oxygen and includes a plurality of ports formed on a top portion and a bottom portion outside of a bed housing;
   a cover portion comprising:
   a front cover and a rear cover which are disposed on a front and a rear of the body portion respectively, and side covers which are detachably disposed on both a left side and a right side, and on a top of the body portion;
   a humidifier tank being installed in a mounting portion put in the front cover to humidify the dry concentrated oxygen, generated from the absorption tower, and then supply the humidified concentrated oxygen, and comprising a cam adjuster wherein the cam adjuster is coupled with an adjustment knob moving in the widthwise direction so that the humidifier tank is fixed on a top of the mounting portion when the humidifier tank moves up, and moves from the top to a lower portion of the mounting portion and thereby is readily withdrawn;
   a display portion being installed in a front top portion of the body portion to display a purity state of oxygen that the user is currently inhaling, a discharge flow rate thereof, and a malfunction for the user's recognition;
   a switch portion comprising:
   a first switch which is installed adjacent to the display portion to switch on/off the oxygen generator, and a second switch which selectively adjusts an oxygen discharge flow rate; and
   a control portion receiving a signal according to a manipulation of the switch portion to control an amount of air supplied from the compressor to the absorption tower and a number of revolutions of the compressor, and control unstable oxygen when the unstable oxygen is generated from the oxygen generator.

2. The oxygen generator as claimed in claim 1, wherein the separator of the body portion comprises:
   a first separator of which one end is spaced apart from a front of the body portion and extended towards a lower portion of the body portion, and of which another end is vertically curved and extended to a rear of the body portion, and including a first passing hole formed on a front end so that the absorbed air via the fan portion is moved to a location of the compressor;
   a second separator being spaced apart from a lower portion of the first separator to be parallel therewith, and including a second passing hole formed on a rear end; and
   a partition wall dividing the inner area by a similar area ratio along a lengthwise direction of the inner area in an exhaustion chamber to discharge the air to an exhaustion grill wherein the exhaustion chamber is formed between a lower portion of the second separator and a bottom board, and the exhaustion grill is formed on the bottom of the body portion.

3. The oxygen generator as claimed in claim 2, wherein a noise blocking panel or sound-absorbing materials are provided on a top and a bottom of each of the first and the second separators to block and absorb noise occurring from within the oxygen generator.

4. The oxygen generator as claimed in claim 2, wherein the partition wall of the body portion comprises:
   a first partition wall of which one end is extended from a center of the widthwise direction of the exhaustion chamber along the lengthwise direction thereof and is externally curved; and
   a second partition wall being installed in a path where the external air flown via the second passing hole is discharged to the exhaustion grill via the first partition wall, and of which one is fixed in the lengthwise direction of the exhaustion chamber to be horizontally extended and of which another end is spaced apart from the first partition wall.

5. The oxygen generator as claimed in claim 2, wherein the compressor of the body portion comprises:
   a damping portion comprising:
   a damping rubber being installed to be spaced apart from another damping rubber on the second separator and absorb various vibrations and shocks wherein the various vibrations and shocks are transmitted to the compressor via the bottom of the oxygen generator; and
   a spring of which one end is fixed to the bottom of the compressor and of which another end is connected to the top of the damping rubber.

6. The oxygen generator as claimed in claim 1, wherein the front cover of the cover portion comprises:
   a guide facing another guide in an inner top portion of the mounting portion to stably receive the humidifier tank when the humidifier tank is mounted to the mounting portion.

7. The oxygen generator as claimed in claim 1, wherein:
   the humidifier tank comprises:
   a cover being formed with a guide piece on a top of a humidifier cup, which is protruded from each of both left and right sides of a cover body to guide an oxygen discharge outlet, formed in the front of the cover body, to face the front of the oxygen generator wherein the water fills the inside of a humidifier cup and the cover body is coupled with a humidifier cup using screws, and
   a combining bracket being fixed to the upper portion of the mounting portion of the front cover and being connected to a tube line into which the concentrated oxygen generated from the absorption tower is input;

the cam adjuster disposed in the lower portion of the humidifier tank comprises:

a receiving portion being inserted from the rear of the mounting portion and including a protrusion upwardly protruded on the center of a receiving groove, and an adjustment cam including an insertion groove which is formed on the bottom of a cam body to receive the protrusion of the receiving portion, and a spiral combining groove which is formed along the upper portion of an outer circumferential surface of the cam body from a lower portion thereof; and the adjustment knob comprises:

an insertion piece being protruded from an inner circumferential surface of an adjustment ring so that the adjustment cam is inserted into the insertion piece wherein the adjustment ring is extended from a handle of the adjustment knob, and a fixing portion being coupled with the adjustment knob, coupled with the adjustment cam, on the adjustment knob, and thereby being fixed on the receiving portion, and including a guide groove to receive a lower end of the humidifier cup.

8. The oxygen generator as claimed in claim 7, wherein an auxiliary groove is formed in the insertion groove of the adjustment cam to be coupled with the plurality of ribs formed on the protrusion.

9. The oxygen generator as claimed in claim 7, wherein a plurality of ribs is formed on the outer circumferential surface of the protrusion of the receiving portion.

10. The oxygen generator as claimed in claim 9, wherein an auxiliary groove is formed in the insertion groove of the adjustment cam to be coupled with the plurality of ribs formed on the protrusion.

11. The oxygen generator as claimed in claim 1, wherein the adjustment knob relatively moves with respect to the fixed adjustment cam and thereby moves up and down the adjustment cam in a state where the adjustment cam is fixed to the protrusion.

12. The oxygen generator as claimed in claim 1, wherein the switch portion comprises a purity detection switch to momentarily detect the purity of oxygen that the user is currently inhaling and thus a current purity is displayed on the display portion according to an operation of the purity detection switch.

13. The oxygen generator as claimed in claim 1, wherein a wheel is installed in each of corners of the body portion on the bottom thereof to smoothly move the oxygen generator, and the wheel includes a lock to stop the movement when the oxygen generator is completely moved and to fix or release the wheel.

* * * * *